United States Patent
Tsai

(10) Patent No.: US 10,337,715 B2
(45) Date of Patent: Jul. 2, 2019

(54) LIGHTING BOX AND MONITORING METHOD THEREFOR

(71) Applicants: HKC Corporation Limited, Shenzhen, Guangdong (CN); Chongqing HKC Optoelectronics Technology Co., Limited, Chongqing (CN)

(72) Inventor: Chia-Jen Tsai, Chongqing (CN)

(73) Assignees: HKC CORPORATION LIMITED, Shenzhen, Guangdong (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/578,577

(22) PCT Filed: May 19, 2017

(86) PCT No.: PCT/CN2017/085159
§ 371 (c)(1),
(2) Date: Nov. 30, 2017

(87) PCT Pub. No.: WO2018/196061
PCT Pub. Date: Nov. 1, 2018

(65) Prior Publication Data
US 2018/0313525 A1     Nov. 1, 2018

(30) Foreign Application Priority Data

Apr. 24, 2017  (CN) .......................... 201710273838.1

(51) Int. Cl.
*F21V 25/00*     (2006.01)
*F21V 29/50*     (2015.01)
(Continued)

(52) U.S. Cl.
CPC .............. *F21V 25/00* (2013.01); *F21V 23/02* (2013.01); *F21V 23/0457* (2013.01);
(Continued)

(58) Field of Classification Search
CPC .......... F21V 25/00; F21V 23/02; F21V 29/50; G08B 21/18; G01K 3/005; G01B 21/24; F21W 2131/40
(Continued)

(56) References Cited

U.S. PATENT DOCUMENTS

| 5,117,562 A | 6/1992 | Dulay et al. |
| 2011/0001438 A1* | 1/2011 | Chemel ................ H05B 37/029 315/297 |

(Continued)

FOREIGN PATENT DOCUMENTS

| CN | 103838267 A | 6/2014 |
| CN | 204328714 U | 5/2015 |

OTHER PUBLICATIONS

International Search Report and Written Opinion in corresponding PCT application PCT/CN2017/085159, dated Dec. 27, 2017, 11 pp. in Chinese.

*Primary Examiner* — Hirdepal Singh
(74) *Attorney, Agent, or Firm* — Juan Carlos A. Marquez; Marquez IP Law Office, PLLC

(57) ABSTRACT

This application provides a lighting box and a monitoring method therefor. The lighting box includes; a power management module, including a monitoring power supply module. The monitoring power supply module includes; a monitoring sensing module; a door opening sensing module; a heat dissipation device, configured to reduce the temperature of the lighting box; and an alarm apparatus, configured to send an alarm signal. The power management module further includes a lighting box power supply module includ- (Continued)

ing a light source module. The power management module controls the monitoring power supply module and the lighting box power supply module.

14 Claims, 3 Drawing Sheets

(51) Int. Cl.
    *F21V 23/02*     (2006.01)
    *G01B 21/24*     (2006.01)
    *G01K 3/00*     (2006.01)
    *G08B 21/18*     (2006.01)
    *F21V 23/04*     (2006.01)
    *F21W 131/40*     (2006.01)

(52) U.S. Cl.
    CPC .............. *F21V 29/50* (2015.01); *G01B 21/24* (2013.01); *G01K 3/005* (2013.01); *G08B 21/18* (2013.01); *F21W 2131/40* (2013.01)

(58) Field of Classification Search
    USPC ........................................................ 340/584
    See application file for complete search history.

(56) References Cited

U.S. PATENT DOCUMENTS

| | | | | |
|---|---|---|---|---|
| 2011/0077758 | A1* | 3/2011 | Tran | G16H 40/67 |
| | | | | 700/94 |
| 2011/0280021 | A1* | 11/2011 | Pollack, Jr. | F21V 3/02 |
| | | | | 362/294 |
| 2014/0306609 | A1* | 10/2014 | Kang | H05B 33/086 |
| | | | | 315/117 |
| 2016/0215968 | A1* | 7/2016 | Spiro | F04D 29/582 |
| 2016/0249748 | A1* | 9/2016 | Winters | A47F 3/0478 |
| | | | | 340/4.34 |
| 2017/0231058 | A1* | 8/2017 | Sadwick | H05B 33/0857 |
| 2017/0351276 | A1* | 12/2017 | Setchell | F27D 21/0014 |

\* cited by examiner

LIGHTING BOX AND MONITORING METHOD THEREFOR

BACKGROUND

Technical Field

This application relates to the field of display apparatus preparation technologies, and driver and circuit designs of a lighting box, and in particular, to a lighting box and a monitoring method therefor.

Related Art

In test devices of the industry of display panels, a large quantity of various light sources are used, and each light source is disposed in a corresponding lighting box. Each light source generates heat in use. When the service life of a light source expires and the light source needs to be replaced, if the temperature of the light source of the lighting box does not decrease to some degree, there is a risk that an operator is burned due to the high temperature of the lighting box.

A current practice in the industry is that before light source replacement, cooling is performed for a period, and the cooling period is determined according to experience of each manufacturer. In most lighting boxes, a temperature sensor is installed to monitor the temperature of an environment in which a light source is used, so as to ensure the environment in which the light source is used, a working temperature of the light source, and normal duration of the life cycle. The temperature sensor may display an ambient temperature in a programmable controller (PC) or a programmable logic controller (PLC), and an alarm temperature may be set to remind the operator.

Although a temperature sensor is disposed in most lighting boxes, when power is cut off to cool a light source, power of the temperature sensor in the lighting box is simultaneously cut off, and consequently, the temperature sensor is out of service, and displays the temperature only on a flat panel. The practice cannot well warn the operator, and a corresponding problem needs to be resolved.

SUMMARY

To resolve the foregoing technical problem, an objective of this application is to provide driver and circuit designs of a lighting box, and in particular, this application relates to a lighting box and a monitoring method therefor, so as to protect an operator from being burned by the high temperature and reduce the cooling period before light replacement, thereby improving the production efficiency.

The objective of this application is achieved and the technical problem thereof is resolved by using the following technical solutions. A lighting box provided according to this application comprises a power management module, comprising a monitoring power supply module, where the monitoring power supply module comprises: a monitoring sensing module; a door opening sensing module; a heat dissipation device, configured to reduce the temperature of the lighting box; and an alarm apparatus, configured to send an alarm signal.

In an embodiment of this application, the door opening sensing module comprises: a door opening alignment sensor, and the door opening alignment sensor is configured to obtain a temperature value of the lighting box in a door-opened state.

In an embodiment of this application, the monitoring sensing module comprises: a monitoring sensor, and the monitoring sensor is configured to obtain a temperature value of the lighting box in a door-closed state.

In an embodiment of this application, the power management module further comprises a lighting box power supply module, and the lighting box power supply module comprises a light source module, where the power management module controls the monitoring power supply module and the lighting box power supply module.

In an embodiment of this application, when the power management module controls to disable the lighting box power supply module, the monitoring power supply module and the alarm apparatus keep running normally.

The objective of this application ay further be achieved and the technical problem thereof may further be resolved by using the following technical measures.

Another objective of this application is a lighting box monitoring method, comprising: providing the lighting box; keeping running by the monitoring power supply module and the alarm apparatus when the lighting box is in a door-opened state, where the lighting box has a set temperature value; and comparing the set temperature value with a temperature value of the current lighting box, and triggering, by using the power management module, a working mode corresponding to the temperature value.

In an embodiment of this application, the door opening alignment sensor is triggered when the lighting box is in the door-opened state; the door opening alignment sensor obtains a temperature value of the current lighting box; and if the temperature value of the lighting box is greater than the set temperature value, the alarm apparatus is triggered to send an alarm signal.

In an embodiment of this application, if the temperature value of the lighting box is greater than the set temperature value, the power management module controls the heat dissipation device to keep running, so as to reduce the temperature of the lighting box.

In an embodiment of this application, the door opening alignment sensor is triggered when the lighting box is in the door-opened state; the door opening alignment sensor obtains a temperature value of the current lighting box; and if the temperature value of the lighting box is less than the set temperature value, the alarm apparatus is not triggered.

In an embodiment of this application, if a temperature value of the lighting box is less than the set temperature value, the power management module controls and stops running of the heat dissipation device.

In an embodiment of this application, when the lighting box is in the door-closed state, the monitoring sensor monitors a temperature value of the lighting box; and if the temperature value of the lighting box is less than the set temperature value, the power management module controls and stops running of the heat dissipation device.

In an embodiment of this application, when the lighting box is in the door-closed state, the monitoring sensor monitors a temperature value of the lighting box; and if the temperature value of the lighting box is greater than the set temperature value, the heat dissipation device keeps running.

In an embodiment of this application, the set temperature value of the lighting box is in a range of 24° C. to 32° C.

Another objective of this application is a lighting box, comprising: a power management module, comprising a monitoring power supply module, where the monitoring power supply module comprises: a monitoring sensing module, comprising a monitoring sensor; a door opening sensing module, comprising a door opening alignment sensor; a heat dissipation device; a lighting, box power supply module, comprising a light source module; and an alarm apparatus, configured to send an alarm signal, where the power management module controls the monitoring power supply module and the lighting box power supply module; the heat dissipation device is a heat dissipation fan, a cooling liquid reflowing apparatus, or a cold air cooling apparatus; and the alarm apparatus is a ringtone-alarm apparatus or an alarm lamp-alarm apparatus.

In this application, by means of the circuit and structural designs of the lighting box, an operator may be protected from being burned by the high temperature, and the cooling period before light replacement may also be reduced, thereby improving the production efficiency.

DETAILED DESCRIPTION

The following embodiments are described with reference to the accompanying drawings, which are used to exemplify specific embodiments for implementation of this application. Terms about directions mentioned in this application, such as "on", "below", "front", "back", "left", "right", "in", "out", and "side surface" merely refer to directions of the accompanying drawings. Therefore, the used terms about directions are used to describe and understand this application, and are not intended to limit this application.

The accompanying drawings and the description are considered to be essentially exemplary, rather than limitative. In figures, units with similar structures are represented by using the same reference number. In addition, for understanding and ease of description, the size and the thickness of each component shown in the accompanying drawings are arbitrarily shown, but this application is not limited thereto.

In addition, in this specification, unless otherwise explicitly described to have an opposite meaning, the word "include" is understood as including the component, but not excluding any other component. In addition, in this specification, "on" means that a component is located on or below a target component, but does not mean that the component needs to be located on top of the gravity direction.

To further describe the technical means adopted in this application to achieve the intended inventive objective and effects thereof, specific implementations, structures, features, and effects of a lighting box and a monitoring method therefor provided according to this application are described below in detail with reference to the drawings and preferred embodiments.

Figure 1:
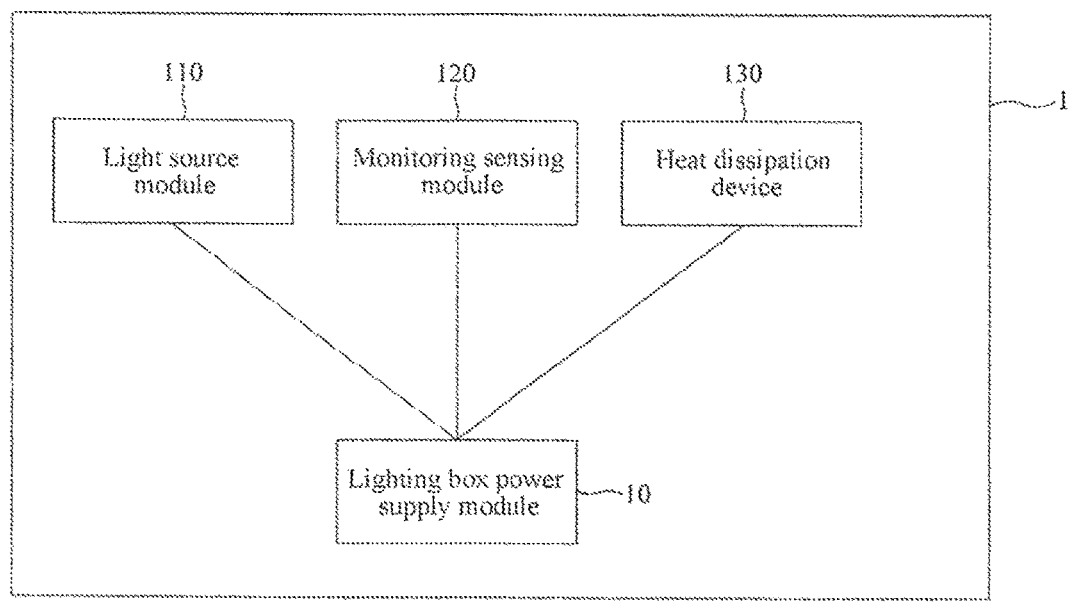
FIG. 1 is a schematic structural diagram of exemplary lighting box power distribution.

FIG. 1 is a schematic structural diagram of exemplary lighting box power distribution. Referring to FIG. 1, an exemplary lighting box 1 includes a lighting box power supply module 10, and the lighting box power supply module 10 includes: a light source module 110, a monitoring sensing module 120, and a heat dissipation device 130. The light source module 110 includes a light source. When a light source inside the lighting box 1 is replaced, the light source module 110 needs to be disabled, and running of the monitoring sensing module 120 is simultaneously stopped, and only a temperature value of the lighting box 1 is displayed on a display flat panel. If when the temperature of the lighting box 1 is excessively high, an operator opens the lighting box 1 to replace the light source, and there is no corresponding alarm or alarm signal to remind the operator, the operator may be easily burned by the lighting box 1 or the light source.

Figure 2:
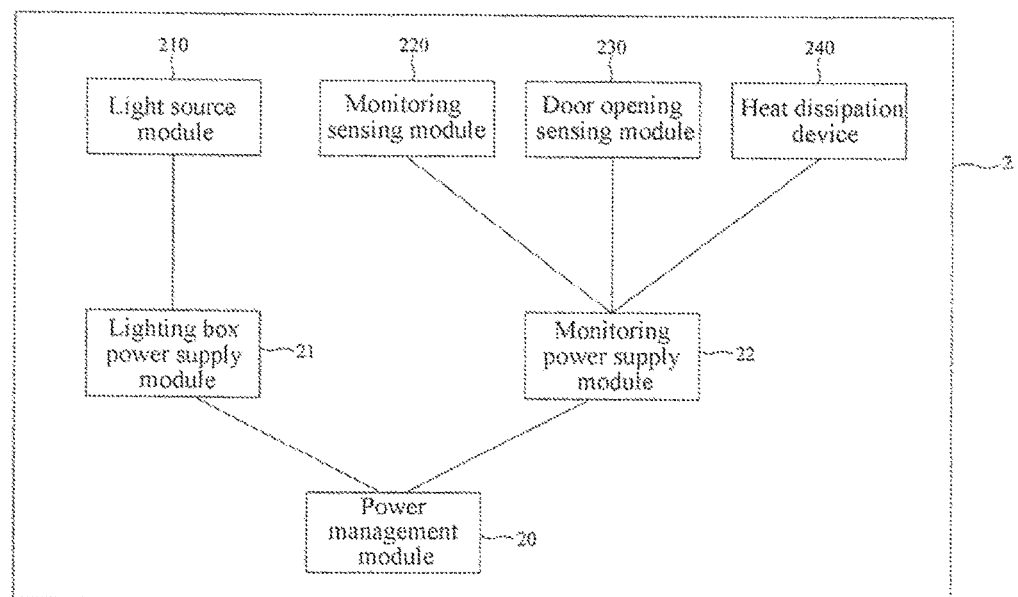
FIG. 2 is a schematic structural diagram of lighting box power distribution according to an embodiment of this application.

FIG. 2 is a schematic structural diagram of lighting box power distribution according to an embodiment of this application. Referring to FIG. 2, in an embodiment of this application, a lighting box 2 includes a power management module 20 compared with the exemplary lighting box 1. The power management module 20 may include a monitoring power supply module 22 and a lighting box power supply module 21, and the monitoring power supply module 22 and the lighting box power supply module 21 are controlled by the power management module 20.

In an embodiment of this application, the lighting box 2 includes: a monitoring power supply module 22, a lighting box power supply module 21, and an alarm apparatus. The monitoring power supply module 22 includes: a monitoring sensing module 220, a door opening sensing module 230, and a heat dissipation device 240. The heat dissipation device 240 is configured to reduce the temperature of the lighting box 2.

In an embodiment of this application, the alarm apparatus is configured to send an alarm signal to warn an operator.

In an embodiment of this application, the door opening sensing module 230 includes a door opening alignment sensor, and the door opening alignment sensor is configured to obtain a temperature value of the lighting box 2 in a door-opened state.

In an embodiment of this application, the monitoring sensing module 220 includes a monitoring sensor, and the monitoring sensor is configured to obtain a temperature value of the lighting box 2 in a door-closed state.

In an embodiment of this application, the lighting box power supply module 21 includes a light source module 210, and the light source module 210 includes a light source.

In an embodiment of this application, the power management module 20 may control the lighting box power supply module 21 and the monitoring power supply module 22 to separately run. That is, when the lighting box power supply module 21 is disabled, running of the monitoring power supply module 22 is not affected; otherwise, when the monitoring power supply module 22 is disabled, running of the lighting box power supply module 21 is not affected, either.

In an embodiment of this application, the light source may be, for example, a halogen lamp, a metal halide lamp, a fluorescent lamp, a light emitting diode, and an ultraviolet lamp In an embodiment of this application, the alarm apparatus may be, for example, a ringtone-alarm apparatus or an alarm lamp-alarm apparatus, and the alarm apparatus may be set according to a requirement of a designer and is not limited thereto.

In an embodiment of this application, the heat dissipation device 240 may reduce the temperature of the lighting box 2 in a heat transfer manner. For example, the heat dissipation device 240 may be a heat dissipation fan, a cooling liquid reflowing apparatus, or a cold air cooling apparatus. The heat dissipation device 240 may be flexibly selected according to factors such as the production requirement and the cooling efficiency. In this specification, possible implementation solutions related to the heat dissipation device 240 are listed, but are not intended to limit the heat dissipation device 240.

Figure 3:
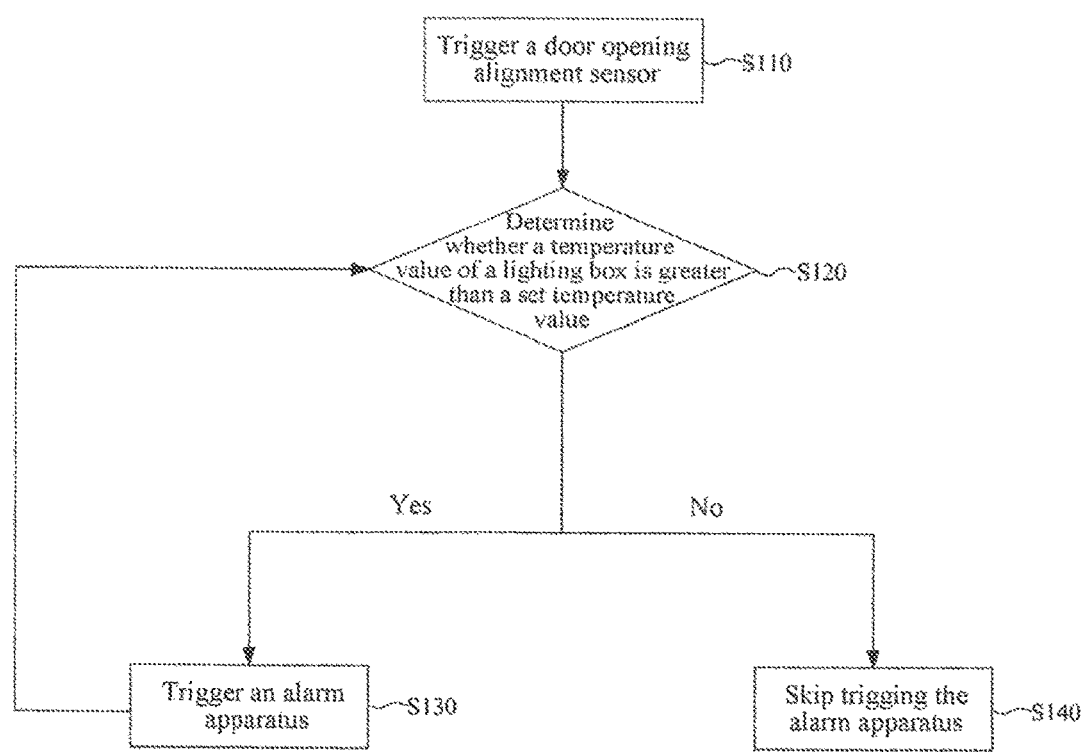
FIG. 3 is a schematic diagram of a program process of an added PLC according to an embodiment of this application.

FIG. 3 is a schematic diagram of a program process of an added PLC according to an embodiment of this application. Referring to FIG. 3, in an embodiment of this application, a program process of a PLC includes the following steps.

Step S110: Trigger a door opening alignment sensor. When an operator opens the lighting box 2, the door opening alignment sensor is triggered. The door opening alignment sensor obtains a dynamic temperature value of the current lighting box 2.

Step S120: Determine whether a temperature value of the lighting box is greater than a set temperature value. The power management module 20 determines and analyzes whether the temperature value of the lighting box 2 is greater than a set temperature value, so as to trigger a working mode corresponding to the temperature value.

Step S130: if the temperature value of the lighting box is greater than the set temperature value, trigger an alarm apparatus. If the temperature value of the lighting box 2 is greater than the set temperature value, the alarm apparatus is triggered to send an alarm signal to warn the operator, and the heat dissipation device 240 keeps running to continue to reduce the temperature of the lighting box 2.

Step S140: If the temperature value of the lighting box is not greater than the set temperature value, skip triggering the alarm apparatus. If the temperature value of the lighting box 2 is less than the set temperature value, the alarm apparatus is not triggered, and running of the heat dissipation device 240 is stopped, so that the operator can safely replace a light source.

In an embodiment of this application, the technical features of the diagram of the program process of FIG. 3 may also be implemented by using, for example, a PC, and this application is not limited only to the PLC.

Referring to both FIG. 2 and FIG. 3, in an embodiment of the present invention, a lighting box monitoring method includes: providing the lighting box 2 and the PLC.

In an embodiment of this application, the lighting box 2 includes: a monitoring power supply module 22, a lighting box power supply module 21, and an alarm apparatus. The monitoring power supply module 22 includes: a monitoring sensing module 220, a door opening sensing module 230, and a heat dissipation device 240. The heat dissipation device 240 is configured to reduce the temperature of the lighting box 2.

In an embodiment of this application, the alarm apparatus is configured to send an alarm signal to warn an operator.

In an embodiment of this application, the door opening sensing module 230 includes a door opening alignment sensor, and the door opening alignment sensor is configured to obtain a temperature value of the lighting box 2 in a door-opened state.

In an embodiment of this application, the monitoring sensing module 220 has a monitoring sensor, and the monitoring sensor is configured to obtain a temperature value of the lighting box 2 in a door-closed state.

In an embodiment of this application, the lighting box power supply module 21 includes a light source module 210, and the light source module 210 includes a light source.

In an embodiment of this application, the light source may be, for example, a halogen lamp, a metal halide lamp, a fluorescent lamp, a light emitting diode, and an ultraviolet lamp, but this application is not limited thereto.

In an embodiment of this application, the alarm apparatus may be, for example, a ringtone-alarm apparatus or an alarm lamp-alarm apparatus, and the alarm apparatus may be set according to a requirement of a designer and is not limited thereto.

In an embodiment of this application, the heat dissipation device 240 may reduce the temperature of the lighting box 2 in a heat transfer manner. For example, the heat dissipation device 240 may be a heat dissipation fan, a cooling, liquid reflowing apparatus, or a cold air cooling apparatus. The heat dissipation device 240 may be flexibly selected according to factors such as the production requirement and the cooling efficiency. In this specification, possible implementation solutions related to the heat dissipation device 240 are listed, but are not intended to limit the heat dissipation device 240.

In an embodiment of this application, the lighting box 2 has a set temperature value. A temperature value of the current lighting box 2 is compared with the set temperature value, and a working mode corresponding to the temperature value is triggered by using the power management module 20.

In an embodiment of this application, when an operator opens the lighting box 2, the lighting box 2 is in the door-opened state, so that the door opening alignment sensor is triggered. The door opening alignment sensor obtains a dynamic temperature value of the current lighting box 2 and compares the temperature value with the set temperature value, and if the temperature value of the current, lighting box 2 is greater than the set temperature value, the alarm apparatus is triggered to send an alarm signal to warn the operator.

In an embodiment of this application, when the alarm apparatus sends an alarm signal, the heat dissipation device 240 keeps running to continue to reduce the temperature of the lighting box 2.

In an embodiment of this application, when an operator opens the lighting box 2, the lighting box 2 is in the door-opened state, so that the door opening alignment sensor is triggered. The door opening alignment sensor obtains a dynamic temperature value of the current lighting box 2 and compares the temperature value with the set temperature value, and if the temperature value of the current lighting box 2 is less than the set temperature value, the alarm apparatus is not triggered, so that the operator can safely replace the light source without the risk of being burned.

In an embodiment of this application, when the alarm apparatus is not triggered, that is, compared with a working temperature of the lighting box 2, the temperature of the current lighting box 2 is low enough, running of the heat dissipation device 240 is stopped.

In an embodiment of this application, when the lighting box 2 is in the door-closed state, the monitoring sensor monitors a temperature value of the current lighting box 2. If the temperature value of the lighting box 2 is greater than the set temperature value, the heat dissipation device 240 normally runs.

In an embodiment of this application, when the lighting box is in the door-closed state, the monitoring sensor monitors a temperature value of the current lighting box 2. If the temperature value of the lighting, box 2 is less than the set temperature value, running of the heat dissipation device 240 is stopped.

In an embodiment of this application, when the lighting box is in, the door-closed state, the monitoring sensor monitors a temperature value of the current lighting box 2. If the temperature value of the current lighting box 2 is far greater than the temperature of the internal environment of the normally running lighting box 2, the alarm apparatus 240 may also be triggered, so that the operator is reminded and a related maintenance person is notified to check the lighting box 2 for troubleshooting.

In an embodiment of this application, the power management module 20 may control the lighting box power supply module 21 and the monitoring power supply module 22 to separately run. That is, when the lighting box power supply module 21 is disabled, running of the monitoring power supply module 22 is not affected; otherwise, when the monitoring power supply module 22 is disabled, running of the lighting box power supply module 21 is not affected, either.

In an embodiment of this application, the set temperature value of the lighting box may be a temperature that does not affect replacement of the light source by an operator. For example, the set temperature value may be a temperature value in a range of 24° C. to 32° C.

In this application, by means of the circuit and structural designs of the lighting box, an operator may be protected from being burned by the high temperature, and the cooling period before light replacement may also be reduced, thereby improving the production efficiency.

Terms such as "in some embodiments" and "in various embodiments" are repeatedly used. Usually, the terms do not refer to the same embodiment; but they may also refer to a same embodiment. Words such as "comprise", "have", "include" are synonyms, unless other meanings are indicated in the context.

The foregoing descriptions are merely preferred embodiments of this application, and are not intended to limit this application in any form. Although this application has been disclosed above through the preferred embodiments, the embodiments are not intended to limit this application. Any person skilled in the art can make some equivalent variations or modifications according to the foregoing disclosed technical content without departing from the scope of the technical solutions of this application to obtain equivalent embodiments. Any simple amendment, equivalent change or modification made to the foregoing embodiments according to the technical essence of this application without departing from the content of the technical solutions of this application shall fall within the scope of the technical solutions of this application.

What is claimed is:

1. A lighting box, comprising:
a power management module, comprising a monitoring power supply module, wherein the monitoring power supply module comprises:
a monitoring sensing module;
a door opening sensing module;
a heat dissipation device that reduces the temperature of the lighting box; and
an alarm apparatus that sends an alarm signal, wherein the door opening sensing module comprises: a door opening alignment sensor, and the door opening alignment sensor is configured to obtain a temperature value of the lighting box in a door-opened state.

2. The lighting box according to claim 1, wherein the monitoring sensing module comprises: a monitoring sensor, and the monitoring sensor obtains a temperature value of the lighting box in a door-closed state.

3. The lighting box according to claim 1, wherein the power management module further comprises a lighting box power supply module, and the lighting box power supply module includes a light source module.

4. The lighting box according to claim 3, wherein the power management module controls the monitoring power supply module and the lighting box power supply module.

5. The lighting box according to claim 3, wherein when the power management module controls to disable the lighting box power supply module, the monitoring power supply module and the alarm apparatus keep running normally.

6. A lighting box monitoring method, comprising:
providing the lighting box according to claim 1;
keeping running by the monitoring power supply module and the alarm apparatus when the lighting box is in a door-opened state, wherein
the lighting box has a set temperature value; and
comparing the set temperature value with a temperature value of the current lighting box, and triggering, by using the power management module, a working mode corresponding to the temperature value.

7. The lighting box monitoring method according to claim 6, wherein the door opening alignment sensor is triggered when the lighting box is in the door-opened state; the door opening alignment sensor obtains a temperature value of the current lighting box; and if the temperature value of the lighting box is greater than the set temperature value, the alarm apparatus is triggered to send an alarm signal.

8. The lighting box monitoring method according to claim 7, wherein the power management module controls the heat dissipation device to keep running, so as to reduce the temperature of the lighting box.

9. The lighting box monitoring method according to claim 6, wherein the door opening alignment sensor is triggered when the lighting box is in the door-opened state; the door opening alignment sensor obtains a temperature value of the current lighting box; and if the temperature value of the lighting box is less than the set temperature value, the alarm apparatus is not triggered.

10. The lighting box monitoring method according to claim 9, wherein the power management module controls and stops running of the heat dissipation device.

11. The lighting box monitoring method according to claim 6, wherein when the lighting box is in the door-closed state, the monitoring sensor monitors a temperature value of the lighting box; and if the temperature value of the lighting box is less than the set temperature value, the power management module controls and stops running of the heat dissipation device.

12. The lighting box monitoring method according to claim 6, wherein when the lighting box is in the door-closed state, the monitoring sensor monitors a temperature value of the lighting box; and if the temperature value of the lighting box is greater than the set temperature value, the heat dissipation device keeps running.

13. The lighting box monitoring method according to claim 6, wherein the set temperature value is in a range of 24° C. to 32° C.

14. A lighting box, comprising:
a power management module, comprising a monitoring power supply module, wherein the monitoring power supply module comprises:
a monitoring sensing module, comprising a monitoring sensor;
a door opening sensing module, comprising a door opening alignment sensor;
a heat dissipation device;
a lighting box power supply module, comprising a light source module; and
an alarm apparatus that sends an alarm signal, wherein the power management module controls the monitoring power supply module and the lighting box power supply module;

the heat dissipation device is a heat dissipation fan, a cooling liquid reflowing apparatus, or a cold air cooling apparatus; and the alarm apparatus is a ringtone-alarm apparatus or an alarm lamp-alarm apparatus.

\* \* \* \* \*